Feb. 17, 1931.  R. A. WISCHIN  1,792,882
PURIFICATION OF LUBRICATING OILS
Filed Oct. 10, 1928
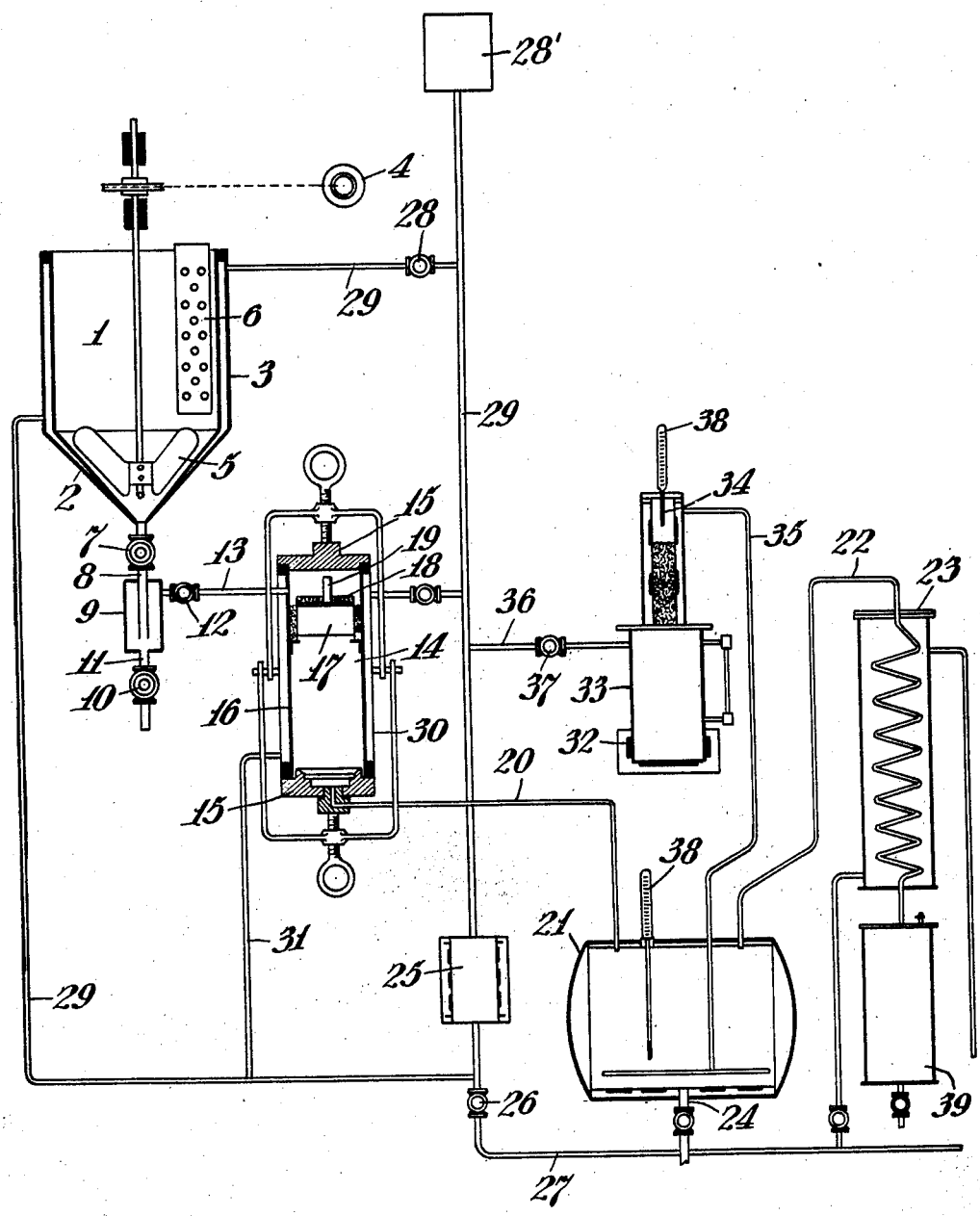
INVENTOR
Rudolf A. Wischin
BY
ATTORNEYS Patented Feb. 17, 1931

1,792,882

UNITED STATES PATENT OFFICE

RUDOLF A. WISCHIN, OF MUNICH, GERMANY

PURIFICATION OF LUBRICATING OILS

Application filed October 10, 1928, Serial No. 311,454, and in Germany November 2, 1927.

The impurities in lubricating oil used in internal combustion engines are partly of a mechanical and partly of a chemical nature. In the main they consist of dust, colloidal soot, small particles of iron and admixed fuel, and of products of oxidation (organic acids), polymerization products (asphaltic substances) and decomposition products, produced by the action of high temperature.

For separating mechanical impurities from such oil, it has been proposed first to heat the oil to about 50 to 60° C., then to add and intimately admix a polymerizing agent, e. g. tetrachloride of tin, aluminum chloride, or sulphuric acid, then gradually to raise the temperature of the mixture to about 70° C., and then to separate the sludge which settles, the partly purified oil being filtered, e. g. by means of fuller's earth.

In factory operation re-refinement has proven to be the only means for cleaning oils used in this manner. However, the carrying out of such a re-refinement process demands great experience and expert knowledge, which, as above stated, can be effected in factory operation only.

Even in factories it has not been possible to introduce this process as yet, as on the one hand gathering the oil at the numerous places where it collects and transporting it to the cleaning apparatus is too expensive, and on the other hand a mixture of oils of the most varied qualities would be obtained in this way. And combustion motors, especially those used with automobiles, should as far as possible be operated with one type of oil only.

Processes or apparatus for purifying used oils can therefore be considered useful only when the regeneration of oils can be effected in every garage by any person—whether expert or not.

The object of my invention is to effect purification which removes in the main those compounds produced in the oil by the action of high temperature, and for this purpose I aim at avoiding any further polymerization in the course of the purifying process, though using sulphuric acid.

To this end, the oil to be purified is, according to my invention, intimately mixed, cold, with concentrated sulphuric acid, and the mixture is gradually heated in the course of several hours to a temperature of about 50 to 60° C., whereupon it is filtered, after flowing through a sludge separator of known type, and then flows through an adsorbing agent, such as fuller's earth, and finally has steam injected into it.

I find that the polymerization referred to is wholly or largely prevented by mixing the acid with the cold oil, and only then gradually heating to not more than about 60° C.

The process covered by my invention solves this task by thoroughly mixing the oil to be purified, while cold, with concentrated sulphuric acid, gradually heating this mixture during a period of several hours to a temperature of about 50 to 60°, passing through a sludge separator, filtering in the known way through an adsorbent (bleaching clay), and finally blowing the mixture through with water steam. Superheated steam of 200° C. has been found most suitable.

Apparatus for carrying out this process includes a mixing vessel and filter—both of which can be heated, a distilling vessel and a cooler with receiver, arranged in series to form an automatically operating unit, having pipe connections to a steam generator and hot water apparatus.

Between the mixing vessel and the filter a sludge separator is installed in the known manner. A filtering inset is placed in the filter over the filter mass (bleaching earth) to prevent dirtying the mass by particles of tar. This filtering inset consists of a perforated body covered with felt or similar material which separates the bleaching mass from the oil chamber, and it has a pipe inserted, the upper end of which is located above the outlet of the oil feed pipe to the filter, the oil passing through this pipe to the bleaching mass.

Circulating warm water pipes are connected to the mixing vessel. The steam generator is fed preferably by the heated circulating pipes. A superheater mounted on the steam generator is filled with heat conductive material (iron shavings) which passes on the heat conducted to it from outside to the steam flowing past.

In the accompanying drawing I have illustrated somewhat diagrammatically an apparatus embodying my invention and for carrying out my improved process.

In the specific form illustrated there is a mixing vessel 1 with a conically tapered bottom 2, a water jacket 3, a stirring mechanism 5 driven by a motor 4, and a baffle 6 serving as a wave breaker. From the bottom 2 leads a tube 8 provided with a cock 7, this tube extending almost to the bottom of a container 9, which is provided at its bottom with an outlet pipe 11, controlled by a tap 10, and forms a sludge separator of known type.

A pipe 13, controlled by means of a cock 12 opens into the container 9 near the top, the other end of the pipe being connected to a filter 14. This consists of a cylindrical vessel 16, partially filled with fuller's earth and having a removable cover 15. The fuller's earth in the vessel 16 is separated by an inverted filtering cup 17 from the oil chamber. The cup 17 is of sheet metal covered with felt, the top 18 being perforated and felt covered. A tube 19 is inserted into the top of the cup, the upper end of the said tube being above the level of the oil supply pipe 13.

A pipe 20 leads from the bottom 15 of the filter 14 to an electrically heated distilling drum 21, which is connected by another pipe 22 to a condenser 23. A pipe 24 controlled by a cock discharges purified oil from the distilling drum 21.

The heating of the mixing vessel is effected by means of a jacket, through which hot water circulates. There is an electric heater 25 for the water, which is taken from the main by means of a pipe 27, controlled by a tap 26. A pipe 29 controlled by means of a tap 28, and connected to a de-aerating vessel 28', leads from the heater 25 to the water jacket 3 of the mixing vessel 1, and back to the heater 25. In the same way the filter 14 is also provided with a water jacket 30, connected to the heater 25 by pipes 31.

A steam generator 33, heated by electrical resistances 32, supports an electrically heated superheater 34. This consists of a cylinder filled with iron filings, and connected to the steam generator. A pipe 35 leads from the superheater into the distilling drum 21. The steam generator 33 is fed by a pipe 36 connected to the pipe 29, the feed being controlled by means of a cock 37. Thermometers 38 are provided for indicating the temperatures in the several containers.

The mode of operation is as follows:

The oil to be purified is introduced into the mixing vessel 1, and concentrated sulphuric acid to the amount of 5 to 7% of the weight of oil is added to it, cold. An intimate mixture of the sulphuric acid with the oil is effected by the stirring mechanism 5 and the wave breaker 6.

After mixing the oil and acid, the temperature in the mixing vessel is gradually raised in the course of 8 to 10 hours to 50 or 60° C., the hourly increase in temperature amounting to about 4 or 5° C. It is of great importance, that the increase in temperature is quite gradual, and that the final temperature is attained only after approximately the time stated. The increase of temperature occurs automatically in the feed pipe 29. For this purpose the wattage of the electric heater 25 is regulatable, so that after regulation thereof in accordance with the quantity of water in circulation there is a temperature increase at a predetermined rate, say 4 to 5° C. per hour.

With this treatment properly carried out, there is no polymerization of the products of cracking present in the oil, such products forming addition compounds with sulphuric acid. Treatment of the oil with clay or the like for precipitating mechanical impurities, is thus dispensed with.

When the temperature of 50 to 60° C. has been attained in the mixing vessel, and the greater portion of the acid tar has been discharged through the tap 10, the oil is discharged from the mixing vessel by way of the sludge separator 9 to the filter 14. The remaining acid tar is deposited in the sludge separator and can subsequently be discharged through the pipe 11.

The sludge separator and the filtering cup 17 in the filter 14 render it unnecessary to resort to subsequent filtration or centrifuging of the oil.

The oil is filtered in the filter 14 through the fuller's earth or other suitable material, at a temperature of about 50 to 70° C. The heating of the filter 14 is effected by the circulating water supply in the same way as the heating of the mixing vessel 1. The filter cup 17 prevents tarry matter from reaching the filtering material, in case through careless operation the acid tar has not all been removed by the sludge separator.

After percolating through the filtering material, the oil flows through the pipe 20 into the distilling drum 21. When all the oil has passed from the filter 14 into the drum, it is heated to 150° C., and then superheated steam at 200° C., from the generator 33, is injected into the oil through the pipe 35. This extracts all the fuel (benzine or other light oils) contained in the oil. As the distilling drum and the oil are heated to 150° C., and the superheated steam is at a temperature of 200° C., no water is left in the oil. The oil is finally discharged through the pipe 24. The treatment with steam has, over distilling by externally applied heat the advantage, that the oil is not so easily damaged.

Steam carrying fuel passes through the pipe 22 to the condenser 23, which discharges into a receiver 39, where the water can be separated from the fuel by drawing off first one, and then the other through a tap at the bottom.

The iron filings in the superheater absorb heat and transfer it to the passing steam. In this way increased efficiency of the superheater is insured.

Treatment of the oil with concentrated sulphuric acid in the manner described does not deteriorate the oil, as frequently happens when sulphuric acid is used with heat. The sulphuric acid only takes up the decomposition products contained in the oil, and goes to the bottom of the vessel with the mechanical impurities suspended in the oil, on account of its higher specific gravity. The separation of the mechanical impurities in the known manner by means of kaolin or the like, followed by protracted filtering, is thus dispensed with.

The action of the apparatus is practically automatic, and it can be attended by unskilled persons. This combined with the comparatively short duration of the process, will enable motor car users to effect the carrying out of the refining of used oil personally.

Having thus described my invention, what I claim as new and desire to secure by Letters Patent is:

1. The process of refining used crank case oil which consists in intimately mixing the oil with concentrated sulphuric acid, at low temperature, gradually heating the mixture in the course of several hours to a temperature of about 50 to 60° C., separating the sludge, removing the suspended solid matter, and injecting steam into the mixture.

2. The process of refining used crank case oil which consists in intimately mixing the oil with concentrated sulphuric acid, without heat, gradually heating the mixture in the course of several hours to a temperature of about 50 to 60° C., passing the mixture through a sludge separator and a filtering agent, and injecting superheated steam at about 200° C. into the mixture.

Signed at Munich, Germany, this 25th day of September, 1928.

DR. RUDOLF A. WISCHIN.